United States Patent [19]

Meden-Piesslinger et al.

[11] 4,391,915

[45] Jul. 5, 1983

[54] PRECISION PRESSED OPTICAL COMPONENTS MADE OF GLASS AND GLASS SUITABLE THEREFOR

[75] Inventors: Gertraud A. A. Meden-Piesslinger; Johannes H. P. Van de Heuvel, both of Eindhoven, Netherlands

[73] Assignee: U.S. Philips Corporation, New York, N.Y.

[21] Appl. No.: 328,344

[22] Filed: Dec. 7, 1981

[30] Foreign Application Priority Data

Oct. 22, 1981 [NL] Netherlands ............... 8104778

[51] Int. Cl.$^3$ .............................................. C03C 3/16
[52] U.S. Cl. ........................................ 501/48; 501/46; 501/47; 501/73; 501/74; 501/76; 501/79; 501/900
[58] Field of Search ................ 501/46, 47, 48, 73, 501/74, 76, 79, 900

[56] References Cited

U.S. PATENT DOCUMENTS

| 3,281,254 | 10/1966 | Weidel | 501/48 |
| 3,328,181 | 6/1967 | Weidel | 501/48 |
| 3,451,829 | 6/1969 | Bromer et al. | 501/48 |
| 3,481,749 | 12/1969 | Godron | 501/48 |
| 3,979,322 | 9/1976 | Alexeev et al. | 501/48 |
| 4,108,673 | 8/1978 | Toratoni et al. | 501/48 |
| 4,110,245 | 8/1978 | Yamashita | 501/48 |
| 4,303,298 | 12/1981 | Yamashita | 501/48 |

FOREIGN PATENT DOCUMENTS 19342 11/1980 European Pat. Off. ............ 501/48

Primary Examiner—Mark Bell
Attorney, Agent, or Firm—Norman N. Spain

[57] ABSTRACT

Optical components can be pressed with such a precision that grinding and polishing of the formed components is not necessary, from glasses containing 45–55 wt. % $P_2O_5$, 3.5–9 wt. % $Al_2O_3$, 5–20 wt. % $K_2O$, 0–3 wt. % $Li_2O$, 8–15% BaO, 4.5–9 wt. % ZnO, 0–6 wt. % MgO, 0–18 wt. % PbO, 0–1 wt. % $SiO_2$, 0–3 wt. % $B_2O_3$, 0–2 wt. % $TiO_2$.

4 Claims, No Drawings

PRECISION PRESSED OPTICAL COMPONENTS MADE OF GLASS AND GLASS SUITABLE THEREFOR

The invention relates to precision pressed optical components made of glass, which components are pressed from a glass containing phosphorus pentoxide, one or more alkali metal oxides and one or more alkaline earth-oxides. The invention also relates to a glass.

The invention relates to optical components such as lenses made of glass. The optical components according to the invention are precision pressed, that is to say they are pressed with such an accuracy and with such a surface quality that, after pressing, grinding and polishing are not required. "Precision pressed" is here understood to mean that, after pressing, without further after-treatment, the optical component does not deviate at any single point of the lens surface by more than 0.5 micrometers from the desired curvature, the surface roughness being less than 0.02 micrometers.

Optical components such as lenses are used in a great variety of products, including film cameras and equipment for reading information with laser beams.

German Offenlegungsschrift 30 37004 discloses glass compositions from which objects can be pressed. The prior art glasses contain (in mole %) 25–55% $P_2O_5$, 0–45% $Li_2O$, 0–20% $Na_2O$, 0–10% $K_2O$, 0–10% MgO, 0–15% CaO, 0–20% SrO, 0–20% BaO and 0.3–3% by weight of F. These glasses may further contain up to 20% PbO, up to 7% $La_2O_3$ and up to 12% ZnO. When they have a $P_2O_5$ content exceeding 45% they may further contain up to 5% $B_2O_3$.

The known glasses become weather-stained when they are stored for more than four hours at a temperature of 50° C. in an air current having a relative humidity of 98%.

The invention provides precision pressed optical components which are pressed from a glass which is more weather-proof than the prior art glass.

According to the invention, the precision pressed glass optical components are characterized in that the glass has the following composition in a percentage by weight:

$P_2O_5$: 45–55
$Al_2O_3$: 3.5–9
$K_2O$: 5–20
$Li_2O$: 0–3
BaO: 8–15
ZnO: 4.5–9
MgO: 0–6
PbO: 0–18
$SiO_2$: 0–1
$B_2O_3$: 0–3
$TiO_2$: 0–2

A glass having a composition within the following limits is very satisfactory.

$P_2O_5$: 51–53
$Al_2O_3$: 4.5–5.5
$K_2O$: 10.5–12
$Li_2O$: 1.5–2.5
BaO: 10–11.5
ZnO: 4.5–5.5
MgO: 1.5–2.5
PbO: 8–9.5
$SiO_2$: 0–1
$B_2O_3$: 2–3
$TiO_2$: 0–2

European patent application No. 0,019,342 discloses precision pressed glass objects, the glass used containing 45–55 mole % $P_2O_5$, 15–40 mole % BaO, 5–35 mole % PbO, 5–15 mole % $Li_2O$, 0–2 mole % $Al_2O_3$ and 0–6 mole % F. The chemical resistance of the used glasses is good. The invention deals with the use of glasses having a further improved chemical resistance.

The optical components in accordance with the invention are pressed from a phosphate glass. Phosphate glasses are generally known. U.S. Pat. No. 4,108,673 describes phosphate glasses for optical uses, which glasses have the following composition (in a percentage by weight) 27–55% $P_2O_3$, 6–26% $K_2O$, 10–50% BaO, $K_2O$+BaO more than 35%, 2–15% $Al_2O_3$; $TiO_2$+$Nb_2O_3$+$Ta_2O_5$ 4–20%, 0–5% $B_2O_3$, 0–2% $LiO_2$, 0–5% $Na_2O$, 0–6% MgO, 0–8% CaO, 0–10% SrO, 0–10% ZnO, 0–13% PbO and 0–2% $As_2O_3$. German Offenlegungsschrift No. 2,806,274 discloses phosphate glasses containing 39–65 mole% $P_2O_5$, 4–13 mole% $Al_2O_3$, 19–36 mole% $K_2O$, 3–18.5 mole% BaO, 0–3 mole% $La_2O_3$ and $Nd_2O_3$ (up to 6 mole%). These known glasses are chemically resistant. They have the disadvantage that they recrystallize when heated to temperatures required for pressing.

Glasses which can be used for the pressing of optical components must satisfy the following requirements.

To enable pressing with a sufficient degree of precision, oxidation of the pressing tool must be avoided as much as possible. Therefore, pressing is effected preferably at the lowest possible temperatures. To render this possible the glass must have an American softening point (that is to say the temperature at which the viscosity of the glass is $10^{7.6}$ poise) of less than 500° C. In view of the pressability the glass must not recrystallize, even if heated above the pressing temperature, usually approximately 50° C. above the American softening point: the glass must be stable. To enable a problem-free rapid cooling after pressing so as to provide high production rates, the glass should not have too high a coefficient of linear expansion: not more than $160 \times 10^{-7}$, preferably less than $130 \times 10^{-7}$ (from 30°–200° C.).

When the glass is used in the form of an optical component, the glass must be sufficiently chemically resistant, that is to say it must not become weather-stained.

The glasses as used in the optical components in accordance with the invention satisfy the above-mentioned requirements.

The glasses as they are used in accordance with the invention contain 45–55 wt.% $P_2O_5$. When the $P_2O_5$ content is reduced to less than 45 wt.% hard glasses are obtained. If a $P_2O_5$ content of more than 55 wt.% is used, the chemical resistance decreases. The $Al_2O_3$ content is chosen between 3.5 and 9 wt.%; below 3.5 wt.% the glasses are not sufficiently chemically resistant, above 9 wt.% the glasses become too hard. A $K_2O$ content of less than 5 wt.% results in excessively hard glasses; above 20 wt.% $K_2O$ the chemical resistance becomes insufficient. The addition of 0–3 wt.% of $Li_2O$ results in an improved stability of the glass. A $Li_2O$ content of more than 3 wt.% does not accomplish a further improvement. The BaO content is chosen between 8 and 15 wt.%. Outside these limits the glasses are not sufficiently chemically resistant. A ZnO content of less than 4.5 wt.% results in glasses which are insufficiently chemically resistant. A ZnO content of more than 9% results in unstable glasses. MgO and PbO may be added to improve the stability of the glass; if more than 6 wt.% MgO and more than 18 wt.% PbO, respectively is used the chemical resistance decreases. The addition of $SiO_2$ and $B_2O_3$ improves the stability of the glasses; $SiO_2$ dissolves only to a quantity of not more than 1 wt.%. The addition of more than 3 wt.% of $B_2O_3$ results in excessively hard glasses. The addition of 0–2 wt.% of $TiO_2$ promotes melting and makes the glass longer, so that it is easier to shape. ("longer" means that the viscosity-temperature curve varies less steeply). The glasses in accordance with the invention have a lowest possible quantity of $Na_2O$ or $CaO$. $Na_2O$ results in a poor chemical resistance; $CaO$ affects the instability adversely.

The composition of the glasses according to the invention is always calculated on the basis of the quantity and the nature of the starting materials used in the preparation of the glasses.

EXAMPLES

A dry mixture was produced from the oxides of zinc, magnesium, lead, silicon, boron and titanium, the carbonates of lithium, potassium and barium and aluminium-phosphate—provided the relevant components are desired in the glass. This mixture was added to a concentrated aqueous solution of phosphoric acid ($H_2PO_4$, 85%). The slurry thus obtained was dried for 24 hours at 220° C. The cake thus formed was crushed and the pieces were melted in a platinum crucible to the desired glass. The glasses 1 to 9, inclusive of the following Table were obtained in this manner.

dies. Pressing was done at a pressure of 110 kg/cm². The lenses obtained satisfied the above-mentioned "precision" requirements. Their curvature deviated nowhere by more than 0.05 micrometer from the desired profile and their surface roughness was less than 0.02 micrometer.

What is claimed is:

1. Precision pressed optical components made of glass, which components are pressed from a glass containing phosphorus pentoxide ($P_2O_5$), one or more alkali metal oxides and one or more alkaline earth oxides, characterized in that the glass consists of in a percentage by weight:

$P_2O_5$: 45–55
$Al_2O_3$: 3.5–9
$K_2O$: 5–20
$Li_2O$: 0–3
$BaO$: 8–15
$ZnO$: 4.5–9
$MgO$: 0–6
$PbO$: 0–18
$SiO_2$: 0–1
$B_2O_3$: 0–3
$TiO_2$: 0–2.

2. Precision pressed glass optical components as claimed in claim 1, characterized in that the glass consists of in a percentage by weight:

$P_2O_5$: 51–53
$Al_2O_3$: 4.5–5.5

| | Glass no. | | | | | | | | | | | | | | | | | |
|---|---|---|---|---|---|---|---|---|---|---|---|---|---|---|---|---|---|---|
| | 1 | | 2 | | 3 | | 4 | | 5 | | 6 | | 7 | | 8 | | 9 | |
| | wt. % | mole % | wt. % | mole % | wt. % | mole % | wt. % | mole % | wt. % | mole % | wt. % | mole % | wt. % | mole % | wt. % | mole % | wt. % | mole % |
| $P_2O_5$ | 52.1 | 42.2 | 47.5 | 38.3 | 54.2 | 45.1 | 53.0 | 42.2 | 51.0 | 40.9 | 54.5 | 47.2 | 49.9 | 39.6 | 54.0 | 46.0 | 54.1 | 45.0 |
| $Al_2O_3$ | 5.1 | 5.7 | 4.0 | 4.5 | 8.6 | 10.0 | 7.0 | 7.8 | 5.0 | 5.6 | 8.0 | 9.6 | 4.9 | 5.4 | 8.1 | 9.6 | 8.4 | 9.7 |
| $K_2O$ | 11.2 | 13.7 | 6.0 | 7.3 | 18.2 | 22.7 | 17.0 | 20.4 | 11.0 | 13.3 | 18.0 | 23.6 | 10.8 | 12.9 | 19.2 | 24.6 | 17.8 | 22.4 |
| $Li_2O$ | 2.0 | 7.7 | 2.0 | 7.6 | 1.0 | 3.9 | 1.0 | 3.8 | 2.0 | 7.6 | 0 | 0 | 2.0 | 7.5 | 0 | 0 | 1.0 | 4.0 |
| $BaO$ | 10.7 | 8.0 | 10.0 | 7.5 | 12.0 | 9.3 | 14.0 | 10.4 | 10.5 | 7.8 | 14.0 | 11.2 | 10.3 | 7.6 | 12.1 | 9.5 | 12.5 | 9.6 |
| $ZnO$ | 5.1 | 7.2 | 8.5 | 12.0 | 5.5 | 8.0 | 5.0 | 7.0 | 5.0 | 7.0 | 5.5 | 8.4 | 6.9 | 9.6 | 5.6 | 8.3 | 5.7 | 8.3 |
| $MgO$ | 2.0 | 5.7 | 5.0 | 14.1 | 0 | 0 | 3.0 | 8.4 | 2.0 | 5.6 | 0 | 0 | 2.0 | 5.6 | 0 | 0 | 0 | 0 |
| $PbO$ | 8.7 | 4.5 | 17.0 | 8.7 | 0 | 0 | 0 | 0 | 8.5 | 4.3 | 0 | 0 | 8.3 | 4.2 | 0 | 0 | 0 | 0 |
| $SiO_2$ | 0.5 | 1.0 | 0 | 0 | 0.5 | 1.0 | 0 | 0 | 0.5 | 1.0 | 0 | 0 | 0.5 | 0.9 | 1.0 | 2.0 | 0.5 | 1.0 |
| $B_2O_3$ | 2.6 | 4.3 | 0 | 0 | 0 | 0 | 0 | 0 | 2.5 | 4.1 | 0 | 0 | 2.4 | 3.9 | 0 | 0 | 0 | 0 |
| $TiO_2$ | 0 | 0 | 0 | 0 | 0 | 0 | 0 | 0 | 2.0 | 2.8 | 0 | 0 | 2.0 | 2.8 | 0 | 0 | 0 | 0 |
| $\alpha \times 10^7$ 30–200° C. | 129 | | 117 | | 142 | | 138 | | 121 | | 154 | | 123 | | 158 | | 146 | |
| AST °C. | 446 | | 483 | | 448 | | 485 | | 490 | | 495 | | 492 | | 464 | | 472 | |

The Table also shows the coefficient of linear expansion and the American softening temperature AST of all the glasses. When reheated to 550° C., these glasses did not show any tendency to recrystallisation. The different glasses were tested as follows to determine their chemical resistance. Samples of all the glasses were exposed for 7 days, every 24 hours to the following influences: 8 hours at 45° C. to an atmosphere having a relative humidity of 100%, followed by a stay of 16 hours at 25° C. in an atmosphere having a relative humidity of 60%. To the glasses in accordance with the invention no weather-corrosion whatsoever occurred in these circumstances.

Optical components, more specifically lenses, were pressed from the glasses no. 1, 5 and 9. The starting point was a spherical blank having a diameter of 8 mm. This blank was pressed in a steel mould to a spherical lens. The mould was preheated to 250° C. Together with a carrier, the blank was heated for four minutes in an oven (the oven temperature was 600° C.). The carrier and the blank were pressed between two pressing $K_2O$: 10.5–12
$Li_2O$: 1.5–2.5
$BaO$: 10–11.5
$ZnO$: 4.5–5.5
$MgO$: 1.5–2.5
$PbO$: 8–9.5
$SiO_2$: 0–1
$B_2O_3$: 2–3
$TiO_2$: 0–2.

3. A glass containing phosphorus pentoxide, one or more alkali metal oxides and one or more alkaline earth oxides, characterized in that the glass consists of in a percentage by weight:

$P_2O_5$: 45–55
$Al_2O_3$: 3.5–9
$K_2O$: 5–20
$Li_2O$: 0–3
$BaO$: 8–15
$ZnO$: 4.5–9

MgO: 0–6
PbO: 0–18
SiO$_2$: 0–1
B$_2$O$_3$: 0–3
TiO$_2$: 0–2.

4. A glass as claimed in claim 3, characterized in that the glass consists of in a percentage by weight:
P$_2$O$_5$: 51–53
Al$_2$O$_3$: 4.5–5.5
K$_2$O: 10.5–12
Li$_2$O: 1.5–2.5
BaO: 10–11.5
ZnO: 4.5–5.5
MgO: 1.5–2.5
PbO: 8–9.5
SiO$_2$: 0–1
B$_2$O$_3$: 2–3
TiO$_2$: 0–2.

* * * * *